United States Patent
Norris

(10) Patent No.: US 10,228,089 B1
(45) Date of Patent: *Mar. 12, 2019

(54) JACK STAND CONSTRUCTION

(71) Applicant: Ronald M. Norris, Norton, VA (US)

(72) Inventor: Ronald M. Norris, Norton, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/545,948

(22) Filed: Jul. 10, 2015

Related U.S. Application Data

(60) Provisional application No. 61/999,178, filed on Jul. 17, 2014.

(51) Int. Cl.
   *F16M 11/22* (2006.01)
   *B66F 3/24* (2006.01)
   *B66F 13/00* (2006.01)

(52) U.S. Cl.
   CPC .............. *F16M 11/22* (2013.01); *B66F 3/24* (2013.01); *B66F 13/00* (2013.01)

(58) Field of Classification Search
   CPC .... B66F 13/00; B66F 3/24; B66F 3/25; B66F 3/30; B66F 3/3242; F16M 11/22
   USPC ........... 280/763.1, 765.1, 766.1; 248/346.01, 248/346.03, 346.05, 352, 357, 676, 188.1, 248/188.2, 188.3, 188.4, 188.8; 254/93 R, 89 H, 2 B; 5/509.1; 52/123.1, 52/111, 115, 118, 126.6
   See application file for complete search history.

(56) References Cited

U.S. PATENT DOCUMENTS

| | | | | |
|---|---|---|---|---|
| 3,572,223 A | * | 3/1971 | Vierregger | E01F 9/635 52/296 |
| 3,837,752 A | * | 9/1974 | Shewchuk | F21V 21/06 248/158 |
| 4,254,927 A | * | 3/1981 | Stonhaus | B66F 13/00 248/346.5 |
| 4,295,308 A | * | 10/1981 | Korfanta | E04H 12/2261 248/158 |
| 4,574,709 A | * | 3/1986 | Lackey | A47B 87/0223 108/11 |
| 4,674,907 A | * | 6/1987 | Shewchuk | F21V 21/10 403/2 |
| 4,850,658 A | * | 7/1989 | Sandor | A47F 5/02 312/225 |
| 5,205,097 A | * | 4/1993 | Harvey | E02D 27/02 248/188.2 |
| 5,720,524 A | * | 2/1998 | Hall | A47C 3/18 108/65 |
| 6,012,185 A | * | 1/2000 | Woods | A47C 19/024 248/188.2 |

(Continued)

OTHER PUBLICATIONS

The American Heritage Dictionary, American Heritage Dictionary Entry: Pipe, retrieved Jul. 31, 2017, https://ahdictionary.com/word/search.html?q=pipe.*

(Continued)

*Primary Examiner* — Jonathan Liu
*Assistant Examiner* — Guang H Guan

(57) ABSTRACT

A steel stand for supporting heavy structures such as road construction and excavating equipment, either with or without a jacking device, wherein the stand has a central tubular steel core member welded at its ends to parallel steel plates, and having a perimetrically positioned plurality of steel, vertical side members spaced substantially circumferentially around the plates.

4 Claims, 4 Drawing Sheets

(56) References Cited

U.S. PATENT DOCUMENTS

| | | | | |
|---|---|---|---|---|
| 6,363,685 | B1* | 4/2002 | Kugler | E04F 15/02183 |
| | | | | 52/126.6 |
| 6,439,543 | B1* | 8/2002 | Peckham | B66F 7/243 |
| | | | | 188/32 |
| 6,464,192 | B1* | 10/2002 | Gibbs, Jr. | B66F 1/025 |
| | | | | 248/352 |
| 6,540,190 | B2* | 4/2003 | Keshavjee | A47B 91/00 |
| | | | | 248/188.2 |
| 7,302,778 | B2* | 12/2007 | MacMillan | E04H 12/2269 |
| | | | | 52/169.9 |
| D649,434 | S* | 11/2011 | Lalancette | D8/354 |
| 8,235,346 | B2* | 8/2012 | Bakos | E02D 27/42 |
| | | | | 248/354.1 |
| 8,464,482 | B2* | 6/2013 | Raynor | E04C 3/34 |
| | | | | 52/169.9 |
| 8,739,941 | B2* | 6/2014 | White | B60P 3/36 |
| | | | | 14/69.5 |
| 9,033,293 | B1* | 5/2015 | Glenn | A47B 91/005 |
| | | | | 248/188.2 |
| 2002/0078638 | A1* | 6/2002 | Huang | E04L 35/10 |
| | | | | 52/126.6 |
| 2009/0072525 | A1* | 3/2009 | Banks | B66C 23/78 |
| | | | | 280/763.1 |

OTHER PUBLICATIONS

The Free Dictionary, Definition of At, Retrieved Dec. 30, 2017, https://www.thefreedictionary.com/at. (Year: 2017).*

\* cited by examiner

JACK STAND CONSTRUCTION

This application claims priority under 35 U.S.C. 119(e)(1) based on Applicant's Provisional U.S. Patent Application Ser. No. 61/999,178 filed Jul. 17, 2014, titled "JACK STAND CONSTRUCTION".

BACKGROUND OF THE INVENTION

This invention is in the field of jack stands and is particularly directed to such stands which are to be used for supporting hydraulic jacks for lifting extraordinary weights, or for supporting such weights per se, e.g. 100 tons or more such as is required for supporting large excavating and earth moving equipment for repairing or replacing their tracks, wheels, tires or other underneath structures. The present construction of the stands is designed to be built in a size and strength to readily surpass the rigid governmentally required construction, structural weight and safety codes for their intended use.

Prior Art: Prior to applicants invention, stands used for supporting heavy loads such as road construction equipment have varied widely in their constructions, for example from piles of used tires to stacks of railroad ties and everything in between. For example, in 2012, a man was killed attempting to change a tire on a 789 Cat Hauler Truck. At the time, the procedure was to stack 6x6 crib blocks to a height of 3 feet, then place a 100-ton bottle jack on top of the crib stack. The crib stack collapsed, causing the man's death under the weight of the truck. As such, compliance with Federal and/or State safety codes have rarely been a major consideration, unfortunately, for workers who have been in a hurry for getting on with their work. The present invention offers a standard line of stands which are all designed for supporting prescribed weights per se, or jacking devices according to all regulations, whereby guessing whether a makeshift stand will safely support the—offtimes—enormous weight.

SUMMARY OF THE INVENTION

The present invention is in a heavy duty stand structure per se or used in combination with a jacking device, wherein the stand structure is configured with top and bottom flat steel plates which are welded at their center portions to the ends of a vertical steel central tube member, and wherein steel vertical side members are welded at their ends to and between perimetric portions of the plates radially spaced from the tube member in spaced array around the perimeter of the plates.

The present stands are built to be used in many types of environments such as mining, construction and heavy equipment dealers, and equipment repair features can be customized for specific needs. The jack stands with attachments work great for supporting dozer blade push arms, equipment counter weights and, with the large cradled attachment, work great for supporting continuous miner heads.

Applicant's stands have been tested and certified to double their advertised capacity by Clisso's Engineering Service. They have also been tested in the field extensively. The stands meet OSHA and MSHA certification requirements. A typical base stand is 20" wide by 20" tall and the top stand is 16" wide by 16" tall. The stands pin together (locate) for safety but can be used individually.

BRIEF DESCRIPTION OF THE DRAWINGS

The present invention will be further explained through the drawings herein and their descriptions wherein.

DETAILED DESCRIPTION

Figure 1:
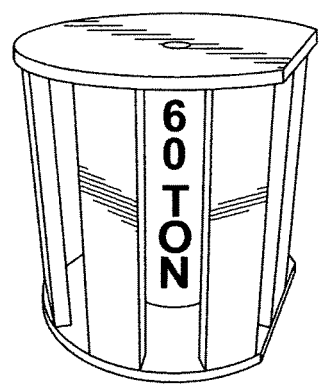
FIGS. 1 and 2 are perspective views of a stand with descriptions thereof.
Figure 2:
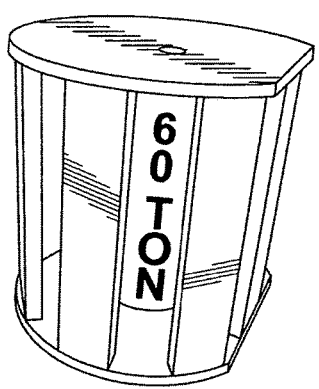
Figure 3:
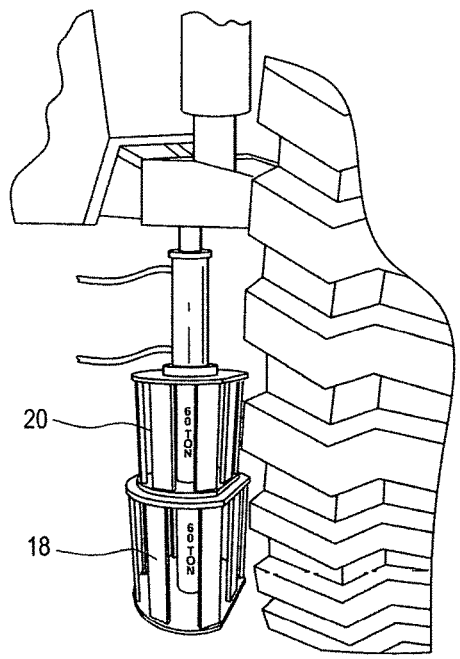
FIG. 3 is a view of the stands in a stacked set, i.e., base and top stands in position under a very heavy hauler machine, and supporting a large capacity hydraulic jack.
Figure 4:
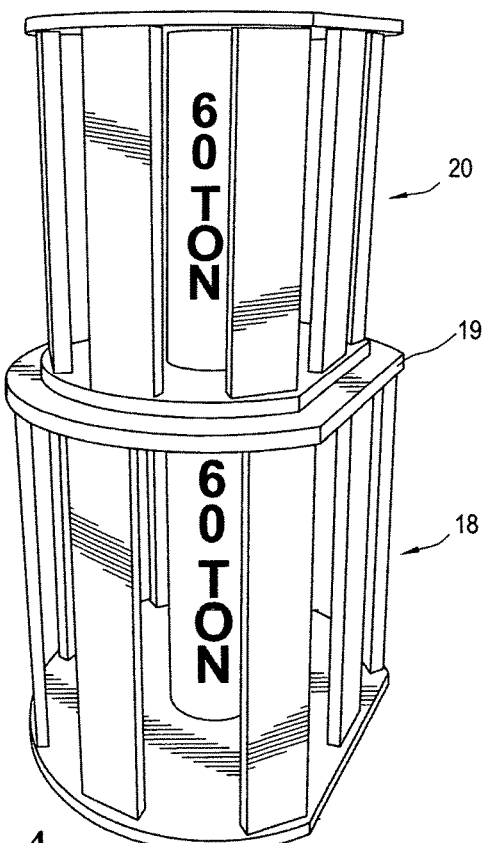
FIG. 4 is an enlarged perspective view of a stacked set of stands.
Figure 5:
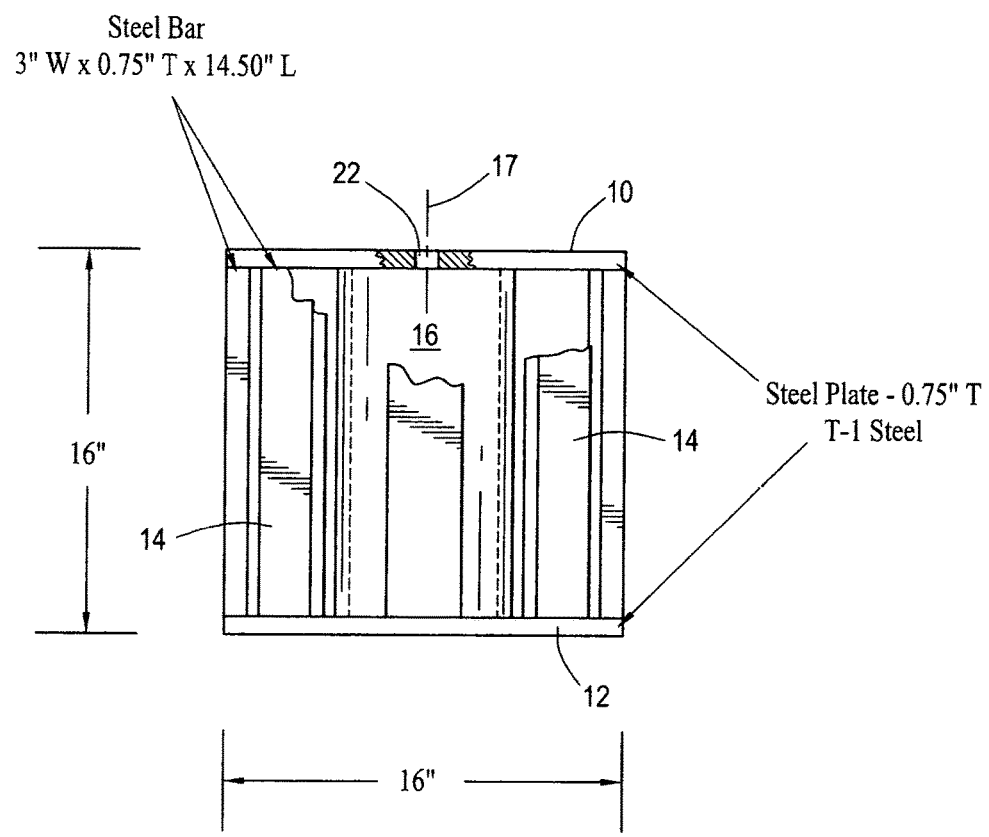
FIG. 5 is a front view (with portions broken away) of the stand taken along line 5 in FIG. 7 wherein W is width, T is thickness, and L is length.
Figure 6:
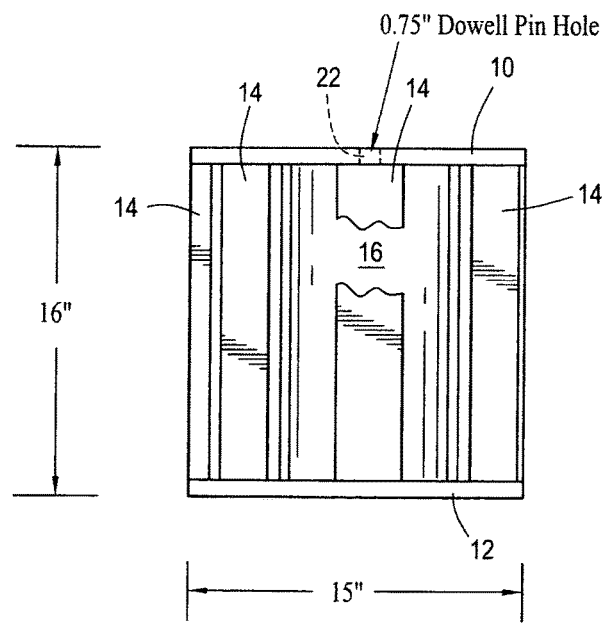
FIG. 6 is a side view of (with portions broken away) of the stand taken along line 6-6 in FIG. 7.
Figure 7:
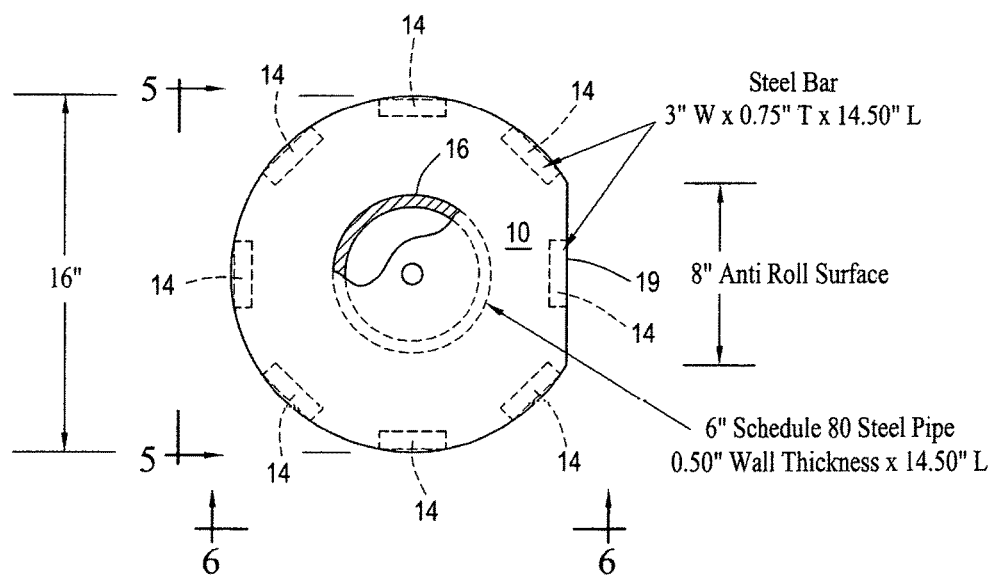
FIG. 7 is a top view (with portions broken away) of the stand.

Referring to the drawings, a summary of the stand construction comprises the welded assembly of a top plate 10, bottom plate 12, a plurality, e.g., 4-12, preferably 6-10 and most preferably eight, equally spaced side support bars 14, and a tubular center support post 16 having a longitudinal axis 17. A preferred set of dimensions for these steel components are given on the drawings. The set of base 18 and 20 stands (FIG. 8) can be of the same or different dimensions as long as good lateral stability and strength of the stand set are preserved. Either or both of 10 and 12 has an anti-roll edge portion (shoulder) 19. This shoulder is dimensioned to prevent accidental rolling of the stand while allowing the stand to be hand rolled into operative position. In a preferred embodiment of the stand set, a centering hole 22, preferably about 0.75 inches diameter, is formed through the top end plate 10 of the base stand 18 on axis 17, and receives a centering or safety dowel pin 24 located on the bottom end plate 12 of the top stand 20, for lateral stability safety. The pin and hole can be reversed on the stand end plates if needed for a special purpose.

Figures 8, 10:
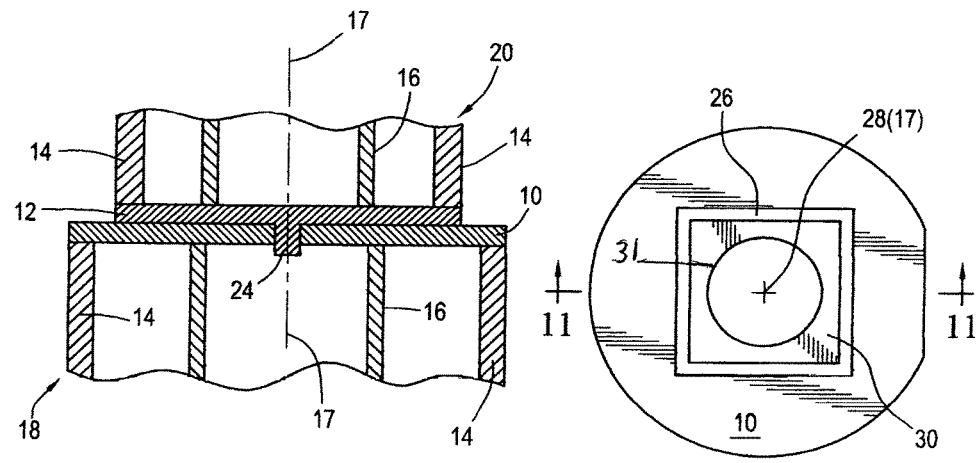
FIG. 8 is a cross-sectional view of contiguous upper and lower end portions of a stacked set of base stand and top stand and showing the centering (locator) safety pin in operative position.
FIG. 10 is a top view of the top plate having a jack locator and axial centering shoulder means.
Figures 9, 11:
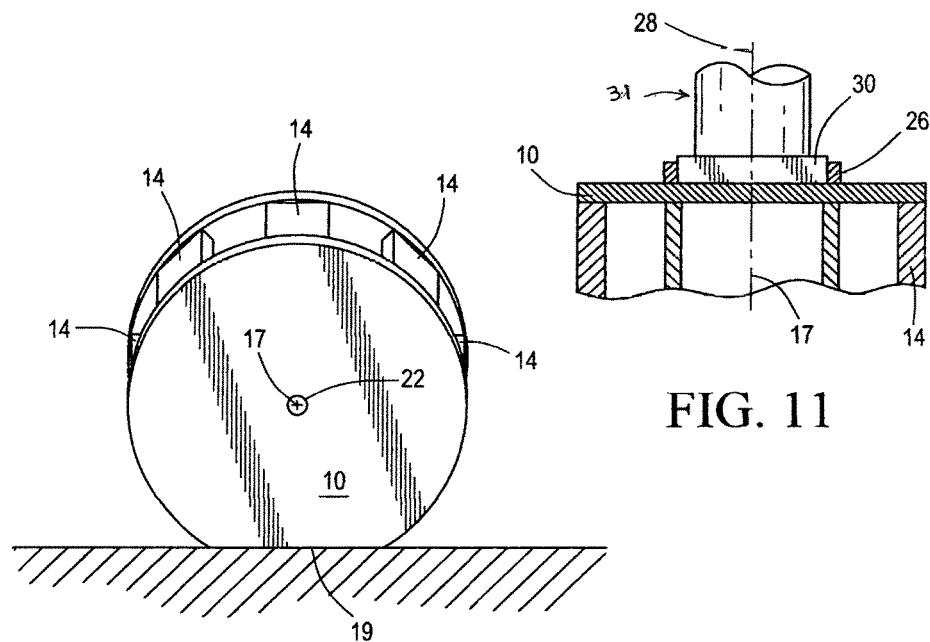
FIG. 9 is a perspective view of the stand on its side on the ground with its anti-roll shoulder in position on the ground.
FIG. 11 is a cross-sectional view taken along line 11-11 in FIG. 10.

Referring to FIGS. 10 and 11, the top plate 10 is provided with indexing (locator) shoulder means 26 welded to 10 wherein longitudinal axis 17 preferably is aligned with the piston axis 28 of a hydraulic jack 31. The configuration of the shoulder means 26 should be such as to snugly receive the base 30 of the jacking device.

The invention has been described in detail with particular reference to preferred embodiments thereof, but it will be understood that variations and modifications will be effected within the spirit and scope of the invention.

I claim:

1. A combination of a lower jack support stand and an upper jack support stand longitudinally axially stacked on top of said lower jack support stand, wherein each of said lower and upper jack support stands comprises:
a substantially flat sided steel top plate,
a substantially flat sided steel bottom plate, and
a vertically elongated steel, tubular center column having a wall with a substantially circular cross-section, said wall having a substantially uniform inside diameter and a substantially uniform outside diameter, said wall further having a bottom end, a top end, and an outer peripheral surface, and said wall forming a bore having a substantially uniform diameter, wherein said bore has a top end, a bottom end, a substantially circular cross-section and a longitudinal axis, wherein each of said top and bottom plates has a substantially circular periphery, a substantially uniform thickness, a top side, a bottom side, and a center axis running through said top and bottom sides of each of said top and bottom plates, wherein said top and bottom sides of each of said top and bottom plates lie in parallel planes, wherein said longitudinal axis of said bore is axially aligned with said center axis of said top plate and with said center axis of said bottom plate, wherein said top end of said tubular center column is welded to said bottom side of said top plate, wherein said bottom end of said tubular center column is welded to said top side of said bottom plate, wherein said bore of said tubular center column is substantially closed off at each end thereof, wherein all said planes of all said sides are parallel to each other and lie at right angles to said longitudinal axis of said bore of said tubular center column, wherein a plurality of plate edge support members is provided with each said support member being substantially straight and elongated and having a vertical axis, an upper end, and a lower end, wherein said upper end of each said support member is welded to said bottom side of said top plate at a location laterally radially spaced from said outer peripheral surface of said wall of said tubular center column and adjacent said periphery of said top plate, wherein said lower end of each said support member is welded to said top side of said bottom plate at a location laterally radially spaced from said outer peripheral surface of said wall of said tubular center column and adjacent said periphery of said bottom plate, wherein said locations for each said support member place each said support member in a substantially vertical position, wherein said vertical axis of each said support member is parallel to said longitudinal axis of said bore, wherein said support members are spaced from each other around the peripheries of said top and bottom plates, wherein all said support members have a same vertical length, wherein an anti-roll flat shoulder is formed in the periphery of at least one of said top and bottom plates, wherein said bottom plate of said upper jack support stand and said top plate of said lower jack support stand are mating plates coupled together by an axial alignment mechanism, said axial alignment mechanism comprising a locator alignment aperture and a locator alignment pin, said locator alignment aperture being formed through a first one of said mating plates along said center axis of said first one of said mating plates, said locator alignment pin having a longitudinal axis aligned with said longitudinal axis of said bore of said tubular center column of each of said upper and lower jack support stands and being affixed to a second one of said mating plates along said center axis of said second one of said mating plates, wherein said locator alignment pin is longitudinally inserted with a close sliding fit through said locator alignment aperture to prevent any lateral sliding of said bottom plate of said upper jack support stand which is stacked on said top plate of said lower jack support stand.

2. The combination of claim 1 wherein said plurality of plate edge support members of each said jack support stand comprises eight plate edge support members substantially equally spaced from each other around said peripheries of said top and bottom plates of each said jack support stand.

3. The combination of claim 1 wherein each said support member of each said jack support stand is rectangular bar shaped in cross-section and is of solid steel.

4. A combination of a hydraulic jack and a jack support stand, wherein said hydraulic jack includes a cylinder, a piston, and a base, wherein said jack support stand in an operating vertical posture comprises a vertically elongated steel tubular center column, wherein said tubular center column is substantially circular in lateral cross-section and is formed by a side wall with a substantially uniform thickness, a substantially uniform inner diameter, a substantially uniform outer diameter, a radially outer peripheral surface, a bottom end and a top end, whereby said side wall forms a bore having a longitudinal axis which extends longitudinally through a radial center of said tubular center column, wherein said jack support stand further comprises a top plate and a bottom plate, wherein each plate has a planar flat upper surface, a planar flat lower surface, a substantially circular radially outer periphery, a substantially uniform thickness, and a center axis running through said upper and lower surfaces of each said plate, wherein said tubular center column is positioned between said top and bottom plates whereby said longitudinal axis of said bore of said tubular center column is axially aligned with said center axis of each said plate, wherein said top end of said side wall is welded to said lower surface of said top plate, and wherein said bottom end of said side wall is welded to said upper surface of said bottom plate, whereby said bore is substantially closed off at top and bottom ends thereof by said top and bottom plates, wherein said upper and lower surfaces of said top and bottom plates lie in planes which are parallel to each other and which lie at right angles to said longitudinal axis of said bore of said tubular center column, wherein a plurality of plate edge support members is provided, wherein each said support member is substantially straight and elongated and having a vertical axis, an upper end, and a lower end, wherein said upper end of each said support member is welded to said lower surface of said top plate at a location thereon which is laterally spaced from said radially outer peripheral surface of said side wall of said tubular center column and which is at said periphery of said top plate, wherein said lower end of each said support member is welded to said upper surface of said bottom plate at a location thereon which is laterally spaced from said radially outer peripheral surface of said side wall of said tubular center column and which is at said periphery of said bottom plate, wherein said locations of all said upper ends and said lower ends of said support members place each said support member in a vertical posture which is parallel to said longitudinal axis of said bore of said tubular center column, wherein said support members are spaced from each other around the peripheries of said top and bottom plates and wherein said vertical axis of each said support member is parallel to said longitudinal axis of said bore of said tubular center column, wherein all said support members have a same vertical length, wherein an anti-roll flat shoulder is formed in the periphery of at least one of said top and bottom plates, wherein indexing shoulder means is provided on and extends vertically upwardly from said top plate, wherein said hydraulic jack is positioned on said top plate with said base of said hydraulic jack laterally confined but slidably removable vertically from within a space delimited by said indexing shoulder means.

* * * * *